(12) United States Patent
Blumenau et al.

(10) Patent No.: US 9,037,659 B2
(45) Date of Patent: May 19, 2015

(54) USE OF BROWSER HISTORY FILE TO DETERMINE WEB SITE REACH

(75) Inventors: Trevor I. Blumenau, Plano, TX (US); David H. Harkness, Wilton, CT (US); Manish Bhatia, Cranbury, NJ (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 13/222,958

(22) Filed: Aug. 31, 2011

(65) Prior Publication Data

US 2011/0314128 A1 Dec. 22, 2011

Related U.S. Application Data

(63) Continuation of application No. 12/242,395, filed on Sep. 30, 2008, which is a continuation of application No. 11/094,061, filed on Mar. 30, 2005, now Pat. No. 7,680,889, which is a continuation of application No. 09/103,026, filed on Jun. 23, 1998, now abandoned.

(51) Int. Cl.
*G06F 15/16* (2006.01)
*G06F 17/30* (2006.01)
*H04L 29/08* (2006.01)

(52) U.S. Cl.
CPC .......... *G06F 17/30867* (2013.01); *H04L 67/34* (2013.01); *H04L 67/22* (2013.01); *H04L 67/02* (2013.01)

(58) Field of Classification Search
CPC ................ H04L 67/22; G06F 11/3438; G06F 17/30867
See application file for complete search history.

(56) References Cited

U.S. PATENT DOCUMENTS

| 3,540,003 | A | 11/1970 | Murphy |
| 3,818,458 | A | 6/1974 | Deese |

(Continued)

FOREIGN PATENT DOCUMENTS

| EP | 0 703 683 | 3/1989 |
| EP | 0 325 219 | 7/1989 |

(Continued)

OTHER PUBLICATIONS

Helinski P: "Automating Web-Site Maintenance Part 2 Perl-based tools to manage your Web site", Web techniques, vol. 1, No. 9, Dec. 1996, pp. (75-78).

(Continued)

*Primary Examiner* — Ranodhi Serrao
*Assistant Examiner* — Thomas Richardson
(74) *Attorney, Agent, or Firm* — Hanley, Flight & Zimmerman, LLC (57) ABSTRACT

Methods and apparatus for using a browser history file to determine web site reach are disclosed. An example method includes receiving a message from a first computer at a second computer after a browser history at the first computer is populated with information, wherein the message includes an identity indication of the first computer and the browser history is maintained by browser functionality native to the browser and sending an application to the first computer from the second computer in response to the message, wherein, when the application is executed at the first computer, the application accesses the browser history, extracts a portion of the browser history, and inserts the extracted portion of the browser history into a communication directed to a third computer.

25 Claims, 5 Drawing Sheets

(56) References Cited

U.S. PATENT DOCUMENTS

| | | |
|---|---|---|
| 3,906,450 A | 9/1975 | Prado, Jr. |
| 3,906,454 A | 9/1975 | Martin |
| T955,010 I4 | 2/1977 | Ragonese et al. |
| 4,168,396 A | 9/1979 | Best |
| 4,230,990 A | 10/1980 | Lert, Jr. et al. |
| 4,232,193 A | 11/1980 | Gerard |
| 4,306,289 A | 12/1981 | Lumley |
| 4,319,079 A | 3/1982 | Best |
| 4,361,832 A | 11/1982 | Cole |
| 4,367,525 A | 1/1983 | Brown et al. |
| 4,558,413 A | 12/1985 | Schmidt et al. |
| 4,588,991 A | 5/1986 | Atalla |
| 4,590,550 A | 5/1986 | Eilert et al. |
| 4,595,950 A | 6/1986 | Lofberg |
| 4,621,325 A | 11/1986 | Naftzger et al. |
| 4,658,093 A | 4/1987 | Hellman |
| 4,672,572 A | 6/1987 | Alsberg |
| 4,685,056 A | 8/1987 | Barnsdale, Jr. et al. |
| 4,696,034 A | 9/1987 | Weidemer |
| 4,703,324 A | 10/1987 | White |
| 4,712,097 A | 12/1987 | Hashimoto |
| 4,718,005 A | 1/1988 | Feigenbaum et al. |
| 4,720,782 A | 1/1988 | Kovalcin |
| 4,734,865 A | 3/1988 | Scullion et al. |
| 4,740,890 A | 4/1988 | William |
| 4,747,139 A | 5/1988 | Taaffe |
| 4,754,262 A | 6/1988 | Hackett et al. |
| 4,757,533 A | 7/1988 | Allen et al. |
| 4,791,565 A | 12/1988 | Dunham et al. |
| 4,821,178 A | 4/1989 | Levin et al. |
| 4,825,354 A | 4/1989 | Agrawal et al. |
| 4,827,508 A | 5/1989 | Shear |
| 4,866,769 A | 9/1989 | Karp |
| 4,914,689 A | 4/1990 | Quade et al. |
| 4,926,162 A | 5/1990 | Pickell |
| 4,940,976 A | 7/1990 | Gastouniotis et al. |
| 4,956,769 A | 9/1990 | Smith |
| 4,970,644 A | 11/1990 | Berneking et al. |
| 4,977,594 A | 12/1990 | Shear |
| 5,023,907 A | 6/1991 | Johnson et al. |
| 5,032,979 A | 7/1991 | Hecht et al. |
| 5,086,386 A | 2/1992 | Islam |
| 5,113,518 A | 5/1992 | Durst, Jr. et al. |
| 5,182,770 A | 1/1993 | Medveczky et al. |
| 5,204,897 A | 4/1993 | Wyman |
| 5,214,780 A | 5/1993 | Ingoglia et al. |
| 5,233,642 A | 8/1993 | Renton |
| 5,283,734 A | 2/1994 | Von Kohorn |
| 5,287,408 A | 2/1994 | Samson |
| 5,343,239 A | 8/1994 | Lappington et al. |
| 5,355,484 A | 10/1994 | Record et al. |
| 5,374,951 A | 12/1994 | Welsh |
| 5,377,269 A | 12/1994 | Heptig et al. |
| 5,388,211 A | 2/1995 | Hornbuckle |
| 5,406,269 A | 4/1995 | Baran |
| 5,410,598 A | 4/1995 | Shear |
| 5,440,738 A | 8/1995 | Bowman et al. |
| 5,444,642 A | 8/1995 | Montgomery et al. |
| 5,450,134 A | 9/1995 | Legate |
| 5,483,658 A | 1/1996 | Greube et al. |
| 5,497,479 A | 3/1996 | Hornbuckle |
| 5,499,340 A | 3/1996 | Barritz |
| 5,584,050 A | 12/1996 | Lyons |
| 5,594,934 A | 1/1997 | Lu et al. |
| 5,675,510 A | 10/1997 | Coffey et al. |
| 5,732,218 A | 3/1998 | Bland et al. |
| 5,796,952 A | 8/1998 | Davis et al. |
| 5,848,412 A | 12/1998 | Rowland et al. |
| 5,892,917 A | 4/1999 | Myerson |
| 5,918,014 A * | 6/1999 | Robinson .................... 709/219 |
| 6,006,332 A | 12/1999 | Rabne et al. |
| 6,012,093 A | 1/2000 | Maddalozzo, Jr. et al. |
| 6,018,344 A | 1/2000 | Harada et al. |
| 6,018,619 A | 1/2000 | Allard et al. |
| 6,049,812 A | 4/2000 | Bertram et al. |
| 6,058,418 A * | 5/2000 | Kobata .................... 709/221 |
| 6,101,510 A * | 8/2000 | Stone et al. .................... 715/234 |
| 6,230,204 B1 | 5/2001 | Fleming, III |
| 6,286,046 B1 * | 9/2001 | Bryant .................... 709/224 |
| 6,338,066 B1 | 1/2002 | Martin et al. |
| 8,312,146 B2 * | 11/2012 | Jawahar et al. ............... 709/227 |

FOREIGN PATENT DOCUMENTS

| | | |
|---|---|---|
| EP | 0 744 695 | 11/1996 |
| GB | 2 176 639 | 12/1986 |
| JP | 5324352 | 12/2003 |
| WO | 9617467 | 6/1996 |
| WO | 9628904 | 9/1996 |
| WO | 9632815 | 10/1996 |
| WO | 9600950 | 11/1996 |
| WO | 9637983 | 11/1996 |
| WO | 9641495 | 12/1996 |
| WO | 9726729 | 7/1997 |
| WO | 9826529 | 6/1998 |
| WO | 9826571 | 6/1998 |
| WO | 9831155 | 7/1998 |

OTHER PUBLICATIONS

International Search Report for patent application serial No. PCT/US97/21643 dated Mar. 16, 1998.
Software Inventorying Technology, "Tally Systems Patents Software Inventorying Technology", Jul. 1, 1996, 5 pages.
Lafferty, M., "Taking the PC out of the Data Comm Pool; New Techniques Bring Mass Market and Net Together on TV". CED: Communications Engineering & Design, vol. 22, No. 9, XP-002079179; pp. 34-38 (Aug. 1996).
"Internet Access Without a PC," WorldGate Communications (Press Release Apr. 29, 1996) (3 pages).
"Lan times 1995 Index: Application Administration & Management," LAN Times (1995) (5 pages).
R. Lisle, "The Management Features in Software-metering toold can save you a bundle," LAN Times, Jul. 3, 1995 (3 pages).
T. Johnson, "Research in the Future:The Role and Measurement of the Internet," ARF 6oth Anniversary Annual Conference and Research Expo, Mar. 11, 12, and 13, 1996 (4 pages).
"The Top Five Advertising Agencies Now Subsribe to PC—Meter Web Measurement Service" at http:www.npd.com:80/pcmpr10.htm on Jul. 1, 1996 (2 pages).
"Demographics," at http://www.w3.org/pub/www/Demographics on Oct. 4, 1996 (3 pages).
D. Hoffman et al., "How big is the Internet," Aug. 18, 1994 (2 pages).
M. Brownstein, "Streamlined and Ready for Action," pp. 81,83-86, 88, 90, 95-96, NETGIUDE 1996.
B. Harvey, "Interactive Standards," pp. 1-6, Vo XIV, Issue 12, The Marketing Pulse, Aug. 31, 1994.
Chiat/Day, The New Video Highway: What will we need to know? How will we measure it?, pp. 1-12, Advertising Research Foundation, Jun. 29, 1994.
M. Green et al., "The Evolution of Research Problems on the Information Superhighway," JMCT Media Researcj, Jun. 1994, 7 pages.
Draft of "Recommended Giudelines for Interactive Advertising and Research," pp. 1-10, Next Century Media, Inc.
"Preliminary Summary Overview of Studies of Interactivity for 4AA Casie Research Sub-Committee," pp. 1-11, next Century Media, Inc.
Release Notes for the NeTraMet as Found on the Worldwide web on Jul. 1, 1996, 2 pages.
Infoseek Internet Search Results When Searching for npdP on Jul. 1, 1996, 2 pages.
Print of page from the Worldwide Web, http://www.npd..com/pcmdef.htm on Jul. 1, 1996, 1 page.
Print of page from the Worldwide Web, http://www.npd.com:80/pcmeter.htm on Jul. 1, 1996, 1 page.
Print of page from the Worldwide Web, http://www.npd.com:80/pcmpr.htm on Jul. 1, 1996, 1 page.
E. English, "The Meter is Running," Lan Times, Mar. 27, 1995, 2 pages.

(56) References Cited

OTHER PUBLICATIONS

Marketing News, Jun. 3, 1996, Section: 1996 Business Report on the Marketing Research Industry, 36 pages.
C. Graziano, "Cash, Check or Charge?", LAN times, Apr. 24, 1995, 1 page.
"Latest NPD Survery Finds World Wide Web Access From Homes Grew Fourfold in Second Half of 1995," from http://www.npd.com:80/meterpr4.htm on Jul. 1, 1996, 1 page.
"First Demographis Data on Home World Wide Web Use Now Available from the NPD Group," from http://www.npd/com:80/meterpr6.htm on Jul. 1, 1996, 1 page.
"America Online is Leading Destination of Web Surfers in First-ever PC-Meter Sweeps Citing Top 25 Web Sites," from http://www.npd.com:80/meterpr5.htm on Jul. 1, 1996, 3 pages.
"NPD's PC Meter Service to Provide More Accurate Measure of World Wide Web Traffic," from http://www.npd.com:80/meter_pr.htm on Jul. 1, 1996, 1 page.
"PC-Meter Now in 1,000 Households Nationwide" from http://www.npd.com:80/meterpr2.htm on Jul. 1, 1996, 1 page.
"PC-Meter Predicts Happy Hollidays for Computer Manufacturers and Retailers," http://www.npd.com:80/meterpr3.htm on Jul. 1, 1996, 1 page.
Electronic News, vol. 42, No. 2110, Apr. 1, 1996, 4 pages.
Interactive Marketing News, Jul. 5, 1996, 2 pages.
Minority Markets Alert, vol. 8, No. 2 ISSN: 1041-7524, Feb. 1, 1996, 1 page.
Advertising age, Special Report, May 20, 1996, 1 page.
Charlottesville Business Journal, vol. 7, No. 2, Thursday, Feb. 1, 1996, 6 pages.
Hirsch, Frederick J., "Building a Graphical Web History Using Tcl/Tk," Jul. 1997, Usenix, pp. 1-3.
Hirch et al., "Creating Custom Graphical Web Views Based on User Browsing History," 1997, The Open Group Research Institute.
Office Action received in the corresponding Canadian application No. 2,247,706, dated Aug. 1, 2006, 4 pages.
Canadian Intellectual Property Office, "Office Action," issued in connection with corresponding application No. CA 2,247,706, on Apr. 7, 2009, 3 pages.
Canadian Intellectual Property Office, "Notice of Allowance," issued in connection with corresponding application No. CA 2,247,706, on May 11, 2010, 1 page.
United States Patent and Trademark Office, "Non-Final Office Action," issued in connection with U.S. Appl. No. 11/094,061, on Sep. 26, 2006, 14 pages.
United States Patent and Trademark Office, "Final Office Action," issued in connection with U.S. Appl. No. 11/094,061, on Jun. 29, 2007, 15 pages.
United States Patent and Trademark Office, "Final Office Action," issued in connection with U.S. Appl. No. 11/094,061, on Mar. 10, 2008, 35 pages.
United States Patent and Trademark Office, "Notice of Allowance," issued in connection with U.S. Appl. No. 11/094,061, on Jun. 6, 2008, 25 pages.
United States Patent and Trademark Office, "Office Action," issued in connection with U.S. Appl. No. 09/103,026, mailed on Mar. 8, 2000, 7 pages.
United States Patent and Trademark Office, "Final Office Action," issued in connection with U.S. Appl. No. 09/103,026, mailed on Aug. 30, 2000, 7 pages.
United States Patent and Trademark Office, "Non-Final Office Action," issued in connection with U.S. Appl. No. 09/103,026, mailed on Jun. 26, 2001, 7 pages.
United States Patent and Trademark Office, "Final Office Action," issued in connection with U.S. Appl. No. 09/103,026, mailed on Dec. 31, 2001, 8 pages.
United States Patent and Trademark Office, "Non-Final Office Action," issued in connection with U.S. Appl. No. 12/242,395, on Jan. 7, 2010, 23 pages.
United States Patent and Trademark Office, "Final Office Action," issued in connection with U.S. Appl. No. 12/242,395, on Sep. 20, 2010, 12 pages.
United States Patent and Trademark Office, "Non-Final Office Action," issued in connection with U.S. Appl. No. 12/242,395, on Jul. 6, 2011, 13 pages.
United States Patent and Trademark Office, "Final Office Action," issued in connection with U.S. Appl. No. 12/242,395, on Feb. 8, 2012, 18 pages.
United States Patent and Trademark Office, "Non-Final Office Action," issued in connection with U.S. Appl. No. 12/242,395, on Jan. 3, 2013, 18 pages.
United States Patent and Trademark Office, "Final Office Action," issued in connection with U.S. Appl. No. 12/242,395, on Aug. 1, 2013, 16 pages.
United States Patent and Trademark Office, "Notice of Allowance," issued in connection with U.S. Appl. No. 12/242,395, on Jun. 6, 2014, 42 pages.

\* cited by examiner

USE OF BROWSER HISTORY FILE TO DETERMINE WEB SITE REACH

RELATED APPLICATIONS

This patent arises from a Continuation of U.S. patent application Ser. No. 12/242,395, filed Sep. 30, 2008, entitled "USE OF BROWSER HISTORY FILE TO DETERMINE WEB SITE REACH", which is a Continuation of U.S. Pat. No. 7,680,889, granted Mar. 16, 2010, filed Mar. 30, 2005, entitled "USE OF BROWSER HISTORY FILE TO DETERMINE WEB SITE REACH", which is a Continuation of U.S. patent application Ser. No. 09/103,026, filed Jun. 23, 1998, entitled "USE OF BROWSER HISTORY FILE TO DETERMINE WEB SITE REACH." U.S. patent application Ser. No. 12/242,395, U.S. Pat. No. 7,680,889, and U.S. patent application Ser. No. 09/103,026 are hereby incorporated by reference in their entirety.

FIELD OF THE DISCLOSURE

The present disclosure relates to an arrangement whereby Web site reach is determined from the history files of browsers.

BACKGROUND OF THE DISCLOSURE

The Internet has proven to be an efficient and popular mechanism for the dissemination of information from content providers to content recipients. Content providers in many cases are organizations, such as businesses, governmental agencies, educational institutions, and the like, who operate Web sites in order to provide information that can be downloaded by content recipients. The content recipients are often consumers who use computers typically located in their dwellings to access the content provided by content providers. However, content recipients may also be other businesses, governmental agencies, educational institutions, and the like. In many cases, a content provider is also a content recipient.

The operators of Web sites, as well as those who create and place content (such as advertisements) for Web sites, have an interest in measuring the reach of content. Reach is typically determined by the number of unique visitors who visit a Web site. Web site operators, and those who create and place content, may then draw market relevant conclusions from the reach of their content.

Several arrangements have been proposed in order to measure reach. For example, it is known for a Web site to itself measure reach by determining the number of unique visitors who visit a Web site. However, such a measurement is localized in that it provides little information about the reach of content offered by other Web sites, such as competitive Web sites. Also, this measurement provides no information about the demographic information about the reach.

Accordingly, it has been proposed to install software meters on the computers of statistically selected panelists so that reach, and other information related to content, can be measured and extrapolated over the population as a whole, in much the same way that TV ratings are generated. According to this proposal, the software meters track operating system messages in order to detect communications of interest. When the software meters detect communications of interest, the software meters log the titles of the corresponding windows which are displayed to a computer user. However, logging titles of windows containing Internet content is not particularly useful because such titles can be very generic. For example, one such title which is popular with many content providers is simply "Home Page." This title provides little indication of the information supplied to the content recipient.

Moreover, tagging of Internet content has been broadly suggested. However, the context in which tagging has been suggested requires widespread industry cooperation, and it is unlikely that such widespread industry cooperation is attainable.

BRIEF DESCRIPTION OF THE DRAWINGS

These and other aspects of the present disclosure will become more apparent from a detailed consideration of the disclosure when taken in conjunction with the drawings.

DETAILED DESCRIPTION

Figure 1:
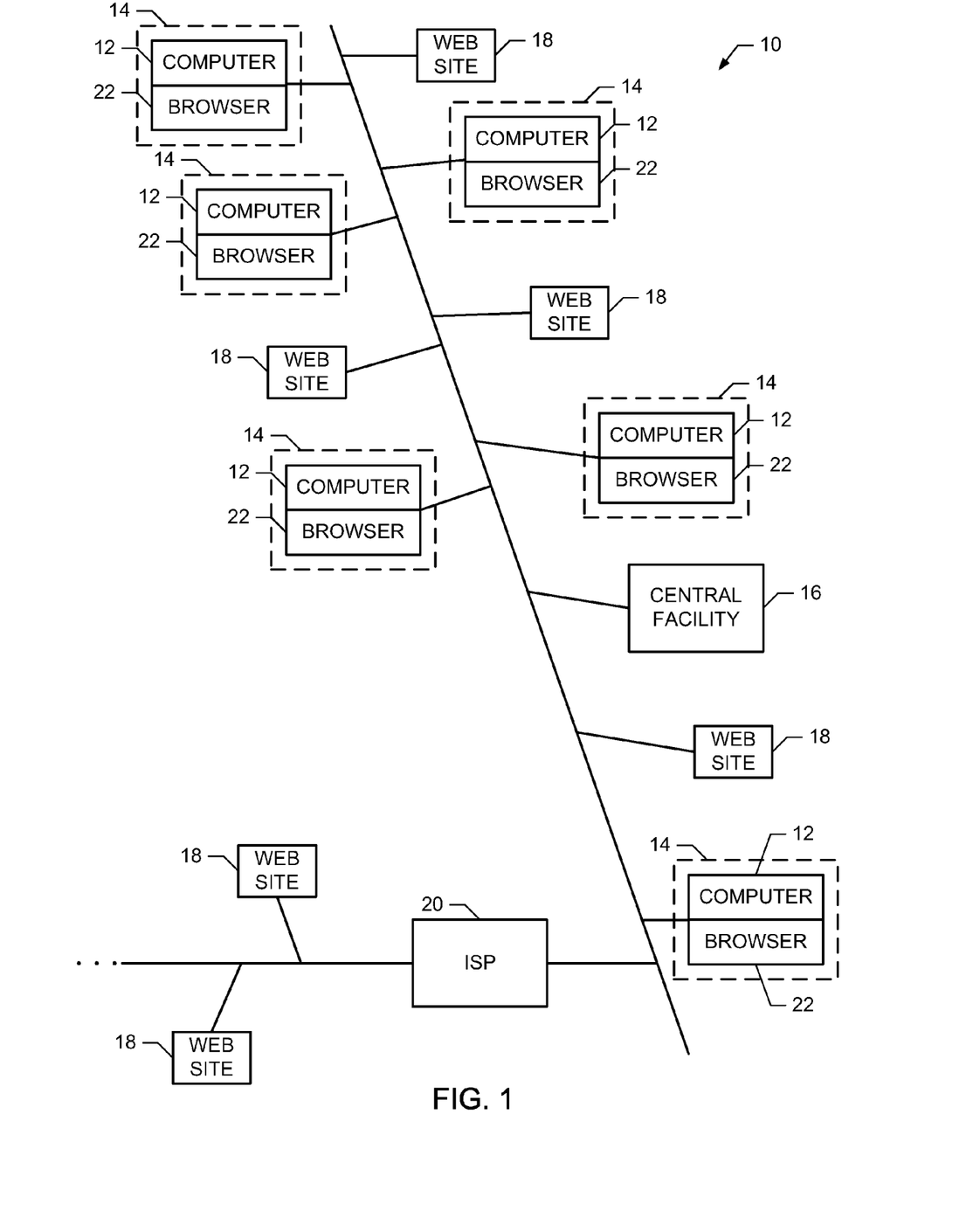
FIG. 1 illustrates a metering system according to the present disclosure in which browser histories are reported to a central facility from a plurality of computers located at corresponding statistically selected sites.

A metering system 10 is shown in FIG. 1 as an exemplary application of the present disclosure. The metering system 10 includes a plurality of computers 12 each of which is located at a corresponding panelist location 14. The computers 12 may be referred to herein as metered computers. The panelist locations 14 are statistically selected, such as by a central facility 16, in order to participate in a Web site reach survey. For example, personnel at the central facility 16 or elsewhere may implement random digit dialing in order to find the users of the computers 12 for participation in the Web site reach survey.

The purpose of the Web site reach survey is to determine the reach of one or more Web sites 18 to the users of the computers 12. The Web site reach survey may provide such information as the number of users reached by the Web sites 18, the demographics of the users reached by the Web sites 18, and the like.

As shown in FIG. 1, one or more of the Web sites 18 may be reached through an Internet Service Provider 20. The users of the computers 12 reach the Web sites 18 through browsers 22 operating on the computers 12. The computers 12, the central facility 16, the Web sites 18, and the Internet Service Provider 20 are interconnected by a network 24 which, for example, may be a public telephone system, an internal network, or the like.

Many browsers, such as the Netscape Navigator® browser and the Internet Explorer browser, store the URLs and other information of the Web pages which are accessed by surfers whenever the surfers go to Web pages, either by clicking on hyper-links or by typing in URLs directly. The Netscape Navigator® browser stores the URLs in a flat database history file, while the Internet Explorer browser stores the URLs and other information in a directory as a structured historical hierarchy according to date and week of access. Surfers use the data stored in these histories to allow them to return to pages which they recently visited.

Therefore, in order to conduct the Web site reach survey, the users of the computers 12, who have been statistically selected as discussed above and who have agreed to participate in the survey, are directed to a Web page residing on a server of the central facility 16. The Web page at the central facility 16 contains a history file retrieval program which the server at the central facility 16 downloads to the computers 12 of those users who have accessed that Web page. The history file retrieval program retrieves the information stored by the browsers 22 in the history files and causes this information to be uploaded to the server of the central facility 16. It should be noted that the server of the central facility 16 preferably stores multiple history file retrieval programs, one for each of the different types of browsers of the panelists participating in the Web site reach survey. Thus, once the server at the central facility 16 has identified the type of browser a panelist accessing its Web page is using, it may download the correct history file retrieval program.

A browser does not necessarily retain the information in its history file indefinitely. For example, some browsers allow the user to set the length of time that history file information is retained. Such browsers may also time stamp each entry in the history file with the time of the last visit. Accordingly, if a user returns to a page that the user has seen before, the time stamp is overwritten with the latest time, such that entries in the history file are not duplicated on repeat visits.

Other browsers store the history information with time stamps in directories according to the week in which the Web pages are visited. These browsers may also permit the user to set the number of days that the historical information is retained. Thus, for example, if the user sets the number of retention days to twenty, these browsers will maintain three directories, one for two weeks ago, one for one week ago, and one for the current week. Therefore, if a user is running such a browser on a Wednesday, there will be subdirectories for Monday, Tuesday, and Wednesday under the Current Week directory in the history file. With this approach, many entries may be duplicated when the same page is visited more than once. For example, a page may appear in each weekday subdirectory and in each prior week directory depending on the user's use of the browser. However, as duplicate entries in the current week directory age (e.g., from Sunday to Monday), many of the entries are deleted or merged into one entry for the week. Duplicate entries across week boundaries are not merged.

Even though the information in these history files in not retained indefinitely, this information is still useful to indicate the number and demographics of people who reach the Web sites 18. Also, the information acquired by the server of the central facility 16 can be improved by the frequency with which the information is uploaded to the server of the central facility 16.

Figure 2:
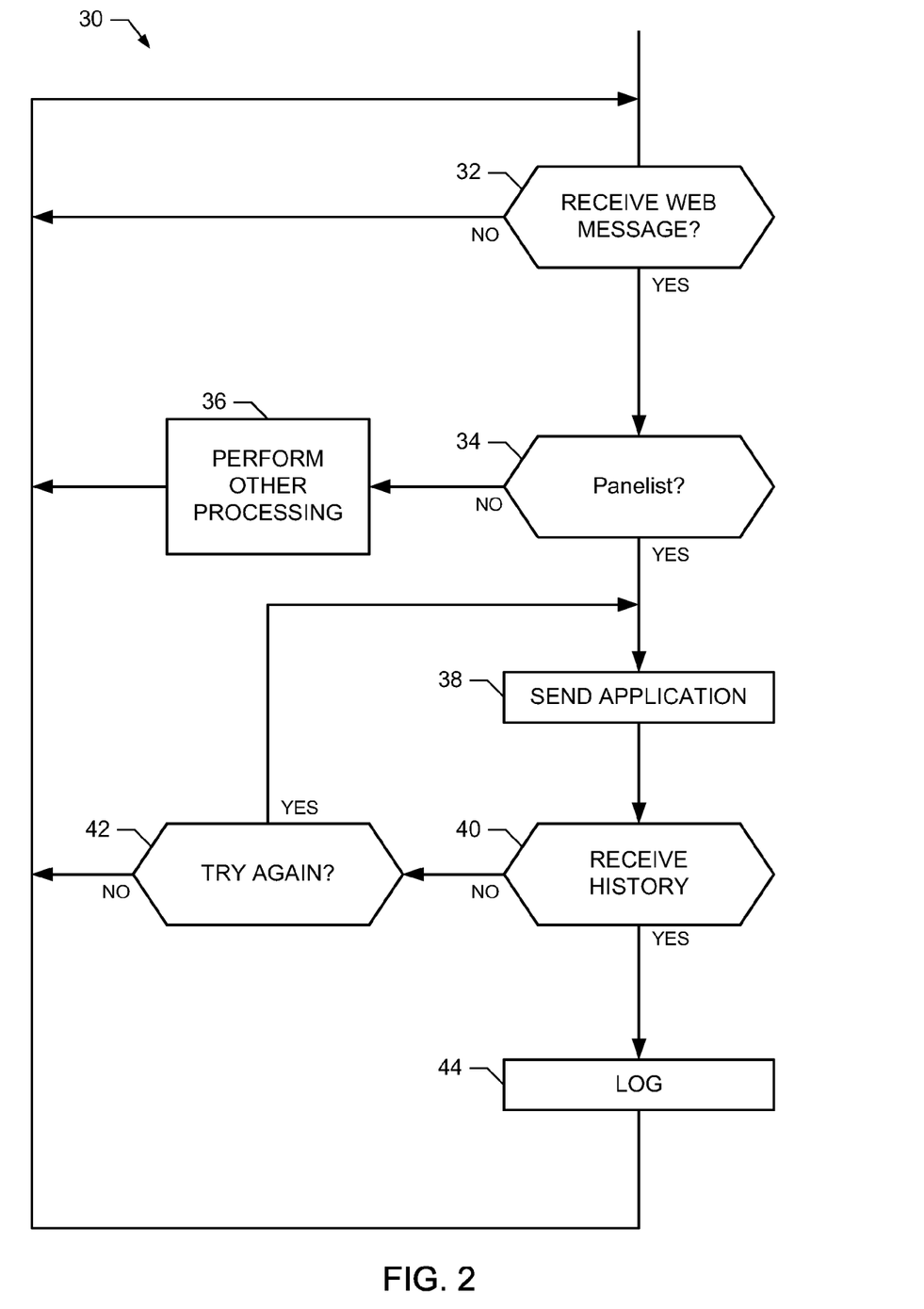
FIG. 2 illustrates an exemplary embodiment of a software routine which may be executed by the central facility in order to obtain the browser histories from the computers of FIG. 1.

Accordingly, the server at the central facility 16 may execute a software routine 30 shown in FIG. 2 whenever a user accesses its home page. The user may access this home page on the user's own initiative, or the software routine 30 may prompt the user to initiate access by sending a message, such as an e-mail, to the user requesting the user to access this home page. However access is initiated, the server at the central facility 16 waits for a Web message at a block 32. When the server at the central facility 16 receives a Web message at the block 32, the server at the central facility 16 determines at a block 34 whether the user sending the current Web message is a panelist who has been selected for participation in the Web site reach survey. For example, the server at the central facility 16 may refer to a list of panelists who have agreed to participate in the Web site reach survey. If the user is not a panelist (e.g., the user is not on the list), the server at the central facility 16 at a block 36 hands off the received message to other software for appropriate processing. (Alternatively, program flow may simply return to the block 32 to await the next message.)

However, if the user is a panelist, an application is sent at a block 38 to the user's computer 12. This application may be a Java applet, JavaScript, or an ActiveX control. The user's permission is required to access information on the hard disk of the user's computer. In Java and JavaScript, permission is obtained in the form of a signed application (as opposed to an unprivileged application that runs in a sand-box environment). An ActiveX application requires the user's authorization even if the application does not need to access the hard disk of the user's computer. The latest versions of many browsers allow a programmer to automate the download and subsequent execution of a signed application on a single Web page. All the panelist may be required to do is to go to the specified Web page and click the "Okay" or similar icon or button in response to a security override request.

The application downloaded to the panelist's computer is arranged to access the history file stored by the computer's browser, to insert the appropriate information stored in the history file into a message, and to communicate the message to the server at the central facility 16. For example, the application may be arranged to open a regular socket back to the server, or the application may be arranged to post the information back to the server through an HTTP daemon, or the application may be arranged to simply e-mail the information back to the server. Alternatively, the application may be arranged to access the history file, to store appropriate information from the history file in a log, and to later communicate the logged information to the server at the central facility 16.

The server at the central facility 16 determines at a block 40 whether the central facility 16 has received information in response to the application downloaded at the block 38. If the server of the central facility 16 has not received the information, the server determines at a block 42 whether it should again send the application down to the user's computer. If the application can be resent, the processing at the blocks 38 and 40 is repeated. In this manner, a predetermined number of attempts may be made to retrieve history data from each panelist. If the application should not be resent, program flow returns to the block 32 to await another message.

If the server at the central facility 16 has received the history information as determined at the block 40, the server at a block 44 suitably processes the history information and then logs the history information in a database along with history information received from other panelists. The history information can be assembled into reports as directed by the customers of the central facility 16.

In processing the history information, the server at the central facility 16 preferably arranges the history information from different browsers into a common format. For example, because some browsers may contain duplicate data and some may not, it may be preferable to eliminate duplicate data. It should be noted that some or all of the processing required to transform the data to a common format may be effected on the panelist's computer.

Also, the data from all weeks and days should be merged and any entry that is a duplicate may be discarded in favor of the most recent entry. The parameter that controls the length of time that the history information is maintained is an integral part of the history information and should preferably be maintained in the server database so that reach data is given the proper time line. For example, data from a browser with an expiration time of ten days cannot be used to measure reach over a period extending to before that interval.

Figure 3:
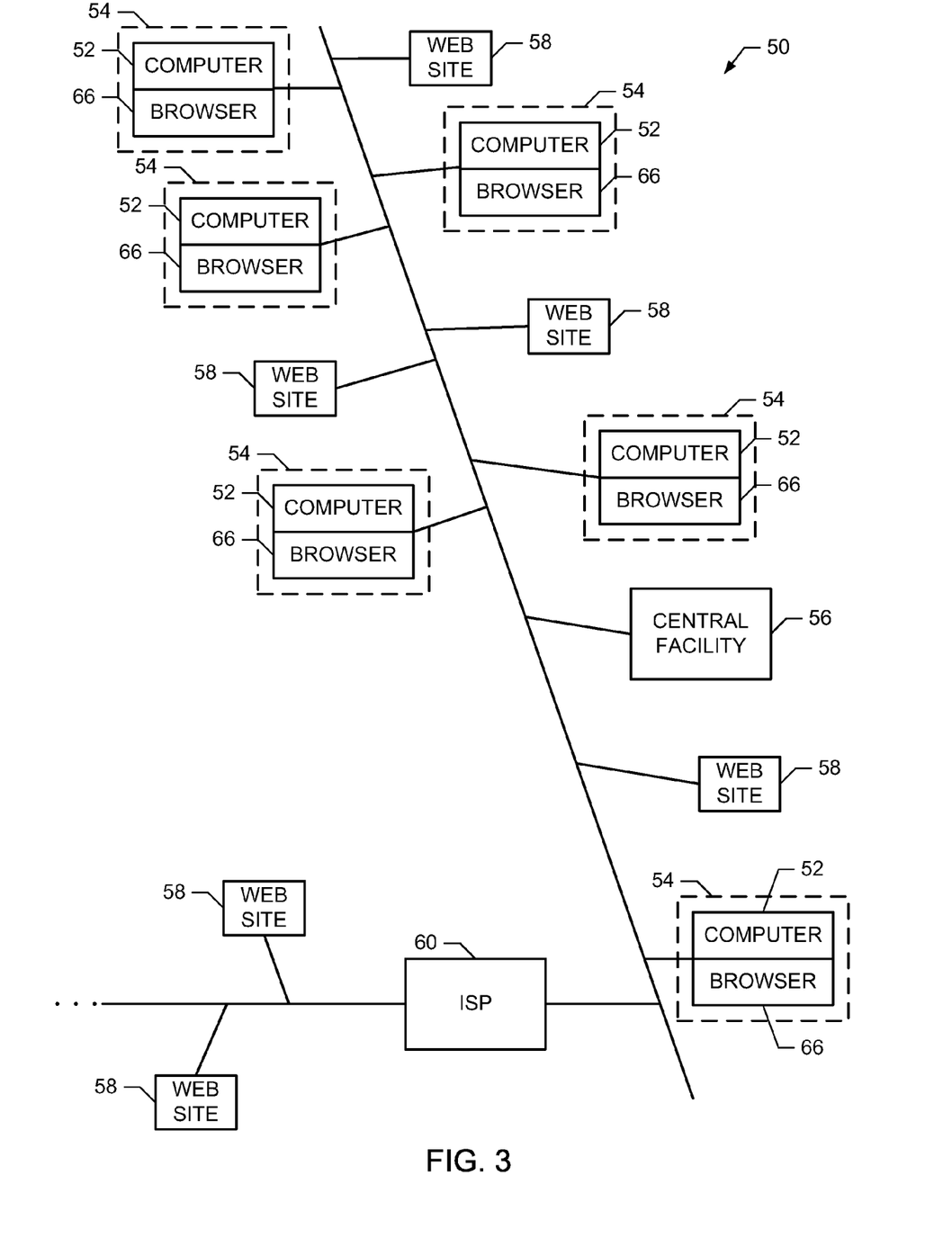
FIG. 3 illustrates an alternative metering system according to the present disclosure in which a plurality of meters resident on computers at corresponding statistically selected sites report browser histories to a central facility.

A metering system 50 shown in FIG. 3 represents an alternative embodiment of the present disclosure. The metering system 50 includes a plurality of computers 52 each of which is located at a corresponding panelist location 54. The computers 52 may be referred to herein as metered computers. The panelist locations 54 are statistically selected to participate in a Web site reach survey. As before, the purpose of the Web site reach survey is to determine the reach of one or more Web sites 58 to the users of the computers 52. As shown in FIG. 3, one or more of the Web sites 58 are reached through an Internet Service Provider 60. The users of the computers 52 reach the Web sites 58 through browsers (not shown) operating on the computers 52. The computers 52, the central facility 56, the Web sites 58, and the Internet Service Provider 60 are interconnected by a network 64 which, for example, may be a public telephone system, an internal network, or the like.

Figure 4:
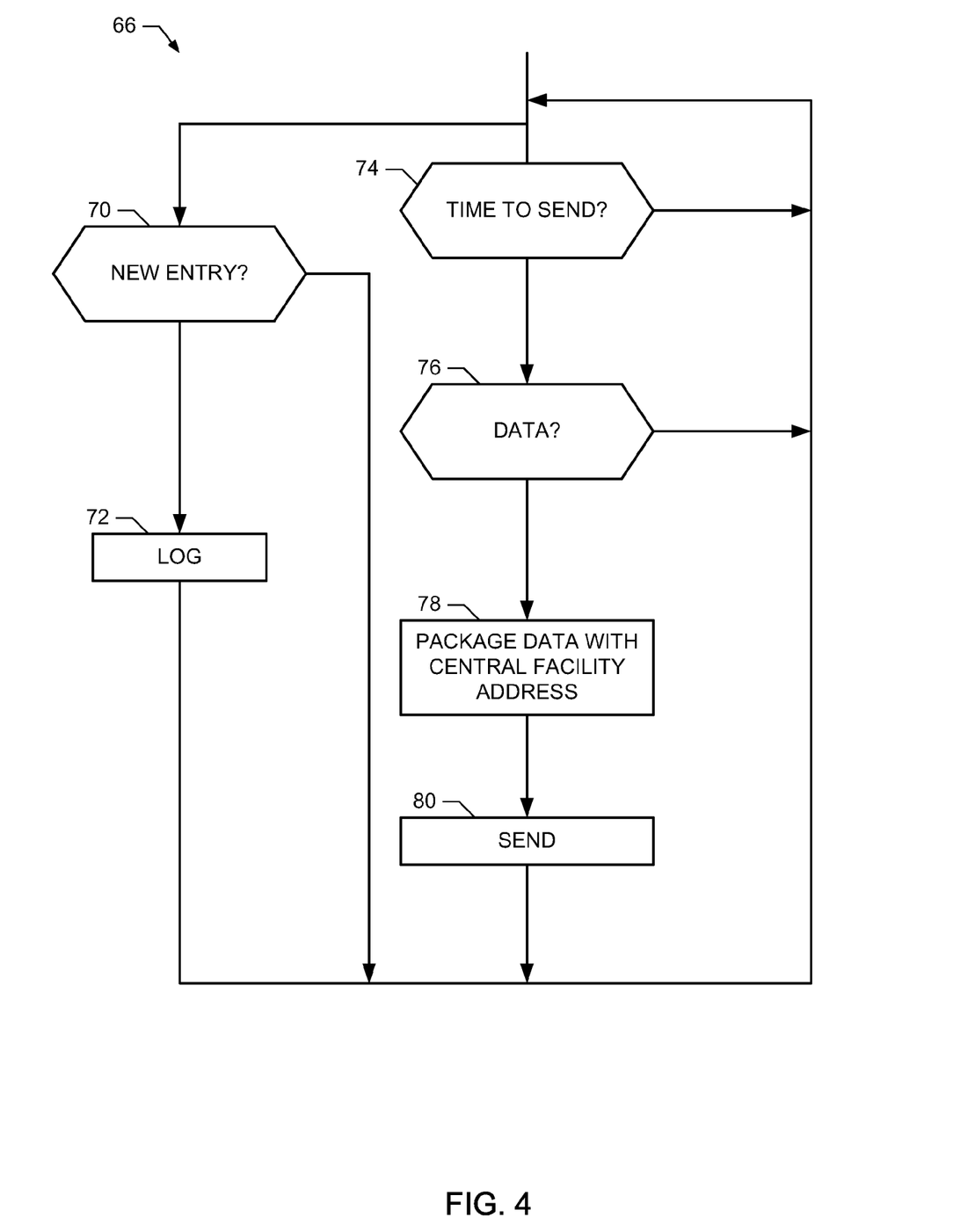
FIG. 4 illustrates an exemplary embodiment of a software routine which may be used for the meters of FIG. 3.

In the metering system 50, a software meter 66 acquires the history information which is accumulated by the browsers running on corresponding ones of the computers 52. The software meter 66, as shown in FIG. 4, determines when a corresponding browser makes an entry into a history file at a block 70. When the software meter 66 determines that the browser is making an entry into the history file, the entry at a block 72 is intercepted, is copied to a separate log file, and is then passed to the history file. In parallel, the software meter 66 determines at a block 74 whether it is time to transmit the contents of the log file to the central facility 56. If it is time to transmit the contents of the log file to the central facility 56, the log file is tested at a block 76 to determine whether it has accumulated any history information since the time for the last transmission to the central facility 56. If history information has been accumulated in the log file since this time, the software meter 66 packages the history information with the address of the central facility 56 in a message at a block 78 and transmits the message at a block 80. After a new entry in the history file is logged at the block 72, or if it is not time to transmit the contents of the log file as determined at the block 74, or if the log file contains no data since the time for the last transmission to the central facility 56 as determined at a block 76, or after the contents of the log file are transmitted to the central facility 56 at the block 80, program flow then returns to the blocks 70 and 74.

Certain modifications of the present disclosure have been discussed above. Other modifications will occur to those practicing in the art of the present disclosure. For example, the software routine 30 is arranged as described above to determine at the block 34 whether a user accessing the central facility is a panelist. Instead, the software routine 30 may be associated with a dedicated survey Web page that can be accessed only by a panelist. If so, the block 34 may be unnecessary, but may be provided as a filter to filter out non-panelists who accidentally access this dedicated Web page.

Also, the software meter 66 is arranged to intercept information being stored in a history file by a corresponding browser. However, the software meter 66 may instead be arranged to access information from this history file on a periodic basis, such as once a day, once a week, or the like.

Moreover, the software meter 66 is described above as being resident on a corresponding computer 52. Instead, the functions performed by the software meter 66 may be performed by a hardware and/or software unit connected to the corresponding computer 52.

Furthermore, the software meter 66 as described above transmits accumulated logged history information. Instead, the software meter 66 may be arranged to transmit the history information as soon as it is detected at the block 70. That is, the software meter 66 copies the history information for immediate transmission to the central facility or other destination. Alternatively, the history information may be simply copied to a disk for posting back to the central facility or other destination.

Additionally, the computers 12 and 52 may be provided with mechanisms to determine the identities of their users and to transmit such identities to the central facilities 16 and 56. For example, the computers 12 and 52 may implement face recognition or other recognition techniques in order to identify the users, or the computers 12 and 52 may require the users to identify themselves. These identifications, together with demographic data about the panelists stored at the computers 12 and 52 or at the central facilities 16 and 56, provide information which is useful in generating reports for the customers of the central facilities 16 and 56.

Figure 5:
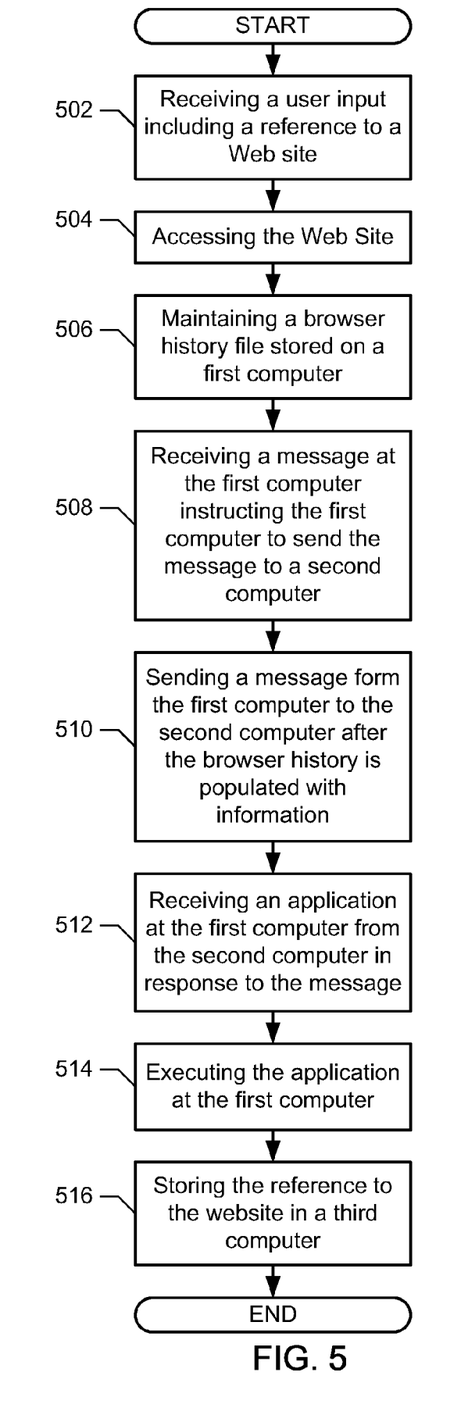
FIG. 5 illustrates an example flowchart of an example method for metering a web site.

FIG. 5 illustrates an example flowchart of an example method for metering a web site. According to the example method, a user input including a reference to a Web site is received at a first computer (block 502). In response, the first computer accesses the website (block 504). The method further comprises, maintaining a browser history stored on the first computer (block 506). The browser history stores a reference to the Web site in response to the browser accessing the Web site. The browser history is maintained by browser functionality native to the browser and the browser history has a first format. A message instructing the first computer to send the message to a second computer is received at the first computer (block 508). A message is then sent from the first computer to the second computer after the browser history is populated with information (block 510). The first computer receives an application from the second computer in response to the message (block 512). The application is executed at the first computer (block 514). Next, the reference to the Web site is stored at a third computer (block 516). Then, the method of FIG. 5 terminates.

Accordingly, the description of the present disclosure is to be construed as illustrative only and is for the purpose of teaching those skilled in the art the best mode of carrying out the disclosure. The details may be varied substantially without departing from the spirit of the disclosure, and the exclusive use of all modifications which are within the scope of the appended claims is reserved.

What is claimed is:

1. A method of metering a Web site, the method comprising:

loading a first monitoring application on a device to be monitored without modifying a browser on the device, wherein the monitoring application is separate from the browser;

retrieving, using the first monitoring application, a reference to a Web site from a history stored by the browser on the device, the history representative of Web sites accessed using the browser, the reference stored by the browser before the monitoring application is loaded, wherein the history stores the reference to the Web site in response to the browser accessing the Web site; and providing the reference to a second application different from the first monitoring application.

2. A method as defined in claim 1, wherein the second application is located on a collection server.

3. A method as defined in claim 1, wherein providing the reference to the second application comprises storing the reference in a log on the device.

4. A method as defined in claim 1, wherein the second application executes at a second device different than the device.

5. A method as defined in claim 1, further comprising transmitting the first monitoring application to the device.

6. A method as defined in claim 5, wherein the second application executes at a second device different than the device and the second device is further to execute the second application.

7. A method as defined in claim 1, wherein the reference includes an identity associated with the device.

8. A method as defined in claim 1, wherein the history has a first format and the first monitoring application is to operate with browser histories having the first format.

9. A tangible computer readable storage disc or storage device, the storage medium comprising a first monitoring application comprising instructions that, when executed, cause an electronic device to at least:
retrieve a reference to a Web site from a history stored by a browser on the electronic device, the history representative of Web sites accessed using the browser, the history to store the reference to the Web site in response to the browser accessing the Web site, the reference stored by the browser before the first monitoring application is loaded, the first monitoring application being separate from the browser; and
provide the reference to a second application different from the first monitoring application.

10. A computer readable storage disc or storage device as defined in claim 9, wherein the second application is located on a collection server.

11. A computer readable storage disc or storage device as defined in claim 9, wherein the instructions are to cause the electronic device to provide the reference to the second application by storing the reference in a log on the electronic device and subsequently transmitting the stored reference to the second application.

12. A computer readable storage disc or storage device as defined in claim 9, wherein the second application is to execute at a second electronic device different than the electronic device.

13. A computer readable storage disc or storage device as defined in claim 9, wherein the instructions are transmitted to the electronic device from the second electronic device.

14. A computer readable storage disc or storage device as defined in claim 13, wherein the second application is to execute at a second electronic device different than the electronic device.

15. A computer readable storage disc or storage device as defined in claim 9, wherein the reference includes an identity associated with the electronic device.

16. A computer readable storage disc or storage device as defined in claim 9, wherein the history has a first format and the first monitoring application is to operate with browser histories having the first format.

17. A method of metering a Web site comprising:
receiving a message from a first computer at a second computer after a browser history at the first computer is populated with information, wherein the message includes an identity indication of the first computer and the browser history is maintained by browser functionality native to the browser; and
sending an application to the first computer from the second computer in response to the message, wherein, when the application is executed at the first computer, the application accesses the browser history, extracts a portion of the browser history, and inserts the extracted portion of the browser history into a communication directed to a third computer.

18. A method as defined in claim 17, wherein the identity indication references an identity of a panelist.

19. A method as defined in claim 17, wherein the identity indication includes a user name.

20. A method as defined in claim 17, wherein the second computer is the third computer.

21. A method as defined in claim 17, further comprising storing in the third computer the portion of the browser history and storing in the third computer browser history information from other computers.

22. A method as defined in claim 17, wherein the message includes credentials to log onto a web page hosted by the second computer.

23. A method as defined in claim 17, wherein the browser history has a first format and the application is to operate with browser histories having the first format.

24. A method as defined in claim 17, further comprising sending a communication to the first computer, the communication including a request to send the message to the second computer.

25. A method as defined in claim 17, wherein the communication includes a webpage.

* * * * *